W. R. WHITNEY.
PURIFICATION OF GASES.
APPLICATION FILED MAR. 6, 1911.
1,022,012.
Patented Apr. 2, 1912.
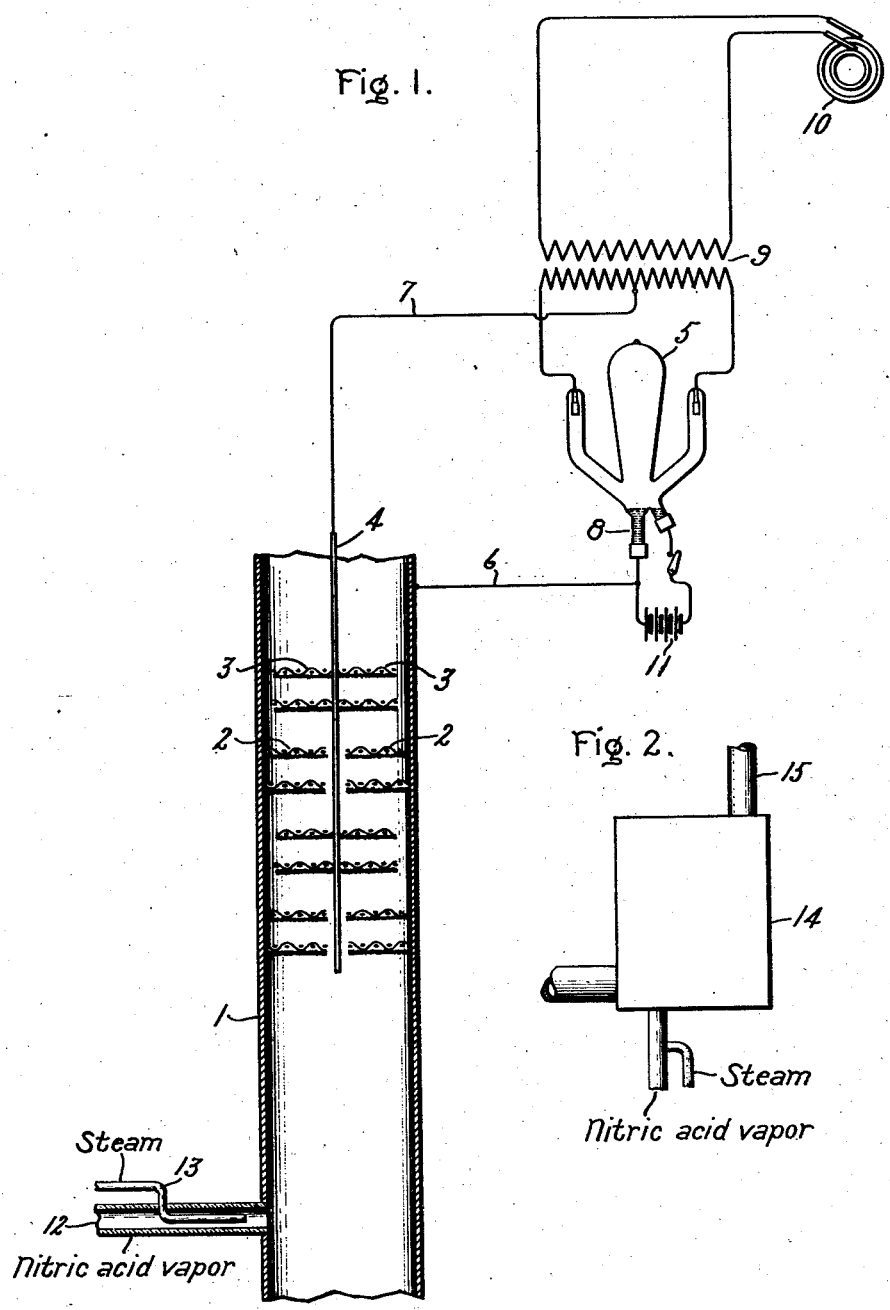
Witnesses:
George H. Tilden
Helen Orford
Inventor:
Willis R. Whitney,
by Albert G. Davis
His Attorney,

UNITED STATES PATENT OFFICE.

WILLIS R. WHITNEY, OF SCHENECTADY, NEW YORK, ASSIGNOR TO GENERAL ELECTRIC COMPANY, A CORPORATION OF NEW YORK.

PURIFICATION OF GASES.

1,022,012.   Specification of Letters Patent.   Patented Apr. 2, 1912.

Application filed March 6, 1911. Serial No. 612,648.

*To all whom it may concern:*

Be it known that I, WILLIS R. WHITNEY, a citizen of the United States, residing at Schenectady, county of Schenectady, State of New York, have invented certain new and useful Improvements in Purification of Gases, of which the following is a specification.

My invention relates to the art of purifying gases such as smelter, or furnace gases, from deleterious fumes, and it has particular reference to the removal of sulfur dioxid from gases.

When gases laden with solid or liquid particles are passed between electrodes which are subjected to great differences of electrical potential, the solid or liquid particles are deposited or precipitated. Gaseous impurities such as sulfur dioxid, however, are not precipitated. Sulfur dioxid fumes are quite as harmful to vegetation as the removable fumes, and it is important, therefore, to eliminate the same.

In accordance with my invention the smelter or furnace gases are first mixed with oxidizing agents which will convert the sulfur dioxid into a precipitatable compound, or compounds, such as sulfuric acid, and the gases are then acted upon by a high potential electrical field.

My invention will best be understood by reference to the accompanying drawings which show diagrammatically how my invention may be carried out.

Figure 1 shows a smelter stack equipped with an electrical depositing device and Fig. 2 diagrammatically illustrates a modification in which the gases pass through a reaction chamber.

The smelter or furnace flue 1 is provided with electrodes, one of which may conveniently consist of, or be connected to the flue wall, when the latter consists of conductive material. In the drawing the electrodes are diagrammatically indicated as consisting of wire mesh, preferably covered with fibrous material such as asbestos. One set of wire mesh 2 is connected with the flue itself, forming one electrode and another set 3 is connected to the other pole diagrammatically indicated as rod 4. These electrodes are connected to any suitable source of high-potential direct-current. As an example of a source of high-potential direct-current I have shown a mercury arc rectifier 5, but it is to be understood, of course, that my invention is not limited to any particular means for creating the desired electric field.

The rectifier connections are the usual ones, well understood in the art. Conductors 6, 7 lead respectively to cathode 8 and the neutral point of the secondary of high potential transformer 9, supplied at its primary by current from an alternating current generator 10. A battery 11 serves to maintain an exciting side branch arc in the rectifier. The fumes and gases ascending the stack or flue 1 pass in a sinuous path between the electrodes and as is well understood the solid and liquid particles are deposited in the high potential field, the purified gases passing on and discharging into the atmosphere. Sulfur dioxid gas $SO_2$ will not be deposited, as it is a gas. In order to remove this gas I introduce into the stack a mixture of aqueous vapor and nitric acid vapor which by the well-known "lead chamber" process converts the sulfur dioxid to sulfuric acid and other liquid or solid products such as nitrosyl sulfuric acid and the like. These liquid or solid products are deposited or precipitated when passing between the high tension poles.

I have indicated in the drawing that nitric acid vapors and steam are introduced into the flue by pipes 12 and 13 respectively, but I wish it to be understood that nitric oxid vapors $NO_2$ may be employed instead of nitric acid vapors and a fine spray of water may introduce the moisture instead of steam, or in case the smelter furnaces are laden with moisture, the addition of nitric acid or nitric oxid vapors alone will serve to produce the necessary reaction.

As indicated in Fig. 2, it is desirable in some cases to mix the nitric acid or nitric oxid fumes and aqueous vapors with the flue gases in a reaction chamber 14 to get a more thorough mixture and to allow the reaction to complete itself before the gases to be purified are conducted by pipe 15 to the electrical precipitating device. Of course, it will be understood that any surplus watery vapor containing dissolved acid is removed by condensation in any suitable manner.

What I claim as new and desire to secure by Letters Patent of the United States, is,—

1. The process of removing sulfur dioxid from gases which consists in introducing steam and nitric acid vapor into said gases, to form sulfuric acid as a product of the resulting reaction, and then subjecting said gases to the precipitating action of high differences of electrical potential whereby the sulfuric acid is deposited.

2. The process of purifying waste gases containing sulfur dioxid as an impurity which consists in mixing it with watery vapor and nitrous oxidizing gases, and then causing said waste gases to pass in proximity to electrode surfaces of widely separated electrical potential whereby sulfuric acid formed by chemical reaction is removed.

In witness whereof, I have hereunto set my hand this 4th day of March, 1911.

WILLIS R. WHITNEY.

Witnesses:
  BENJAMIN B. HULL,
  HELEN ORFORD.